UNITED STATES PATENT OFFICE.

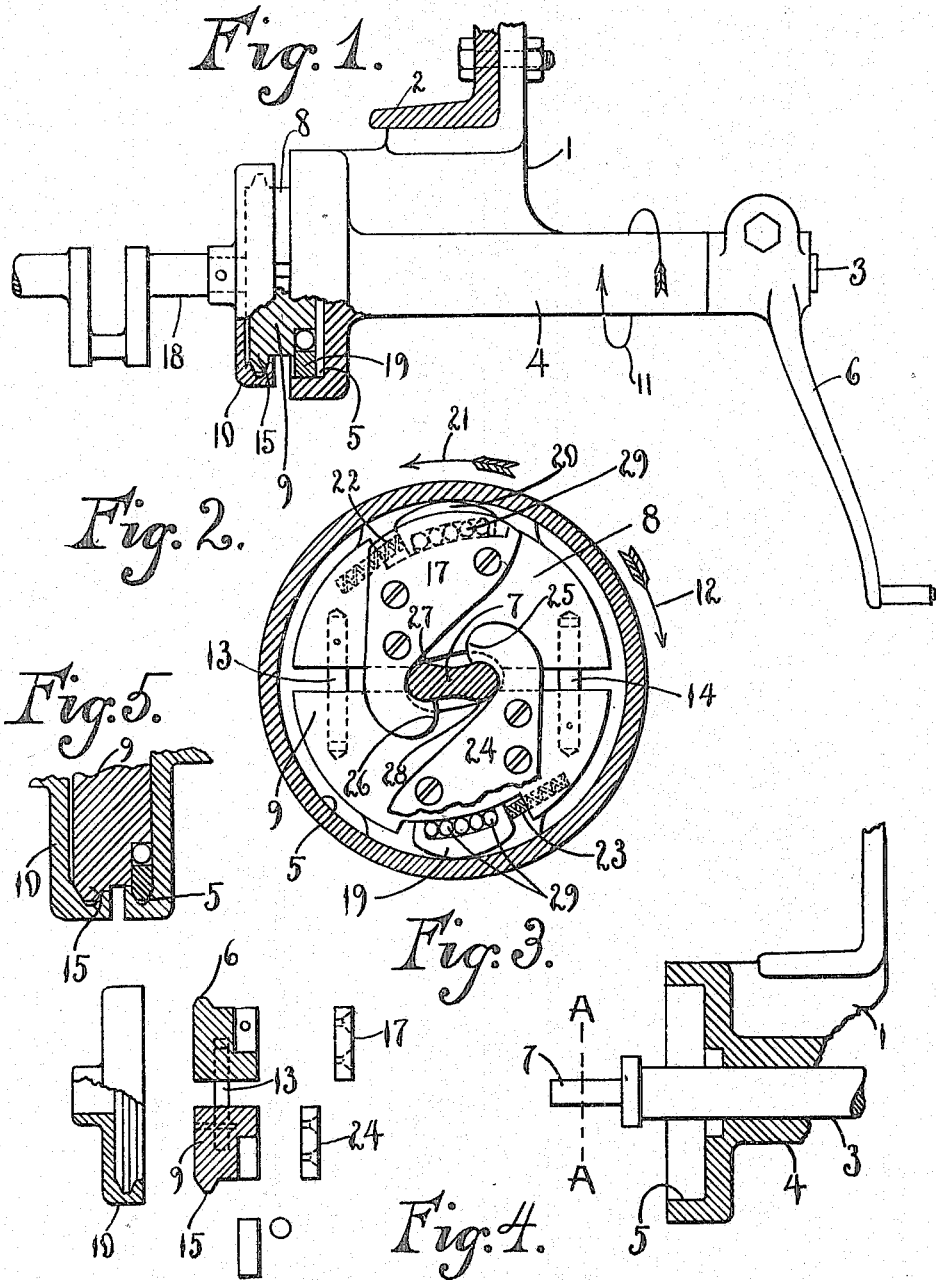

LEWIS C. VAN RIPER, OF NEW YORK, N. Y.

STARTING DEVICE FOR EXPLOSIVE-ENGINES.

1,129,251. Specification of Letters Patent. Patented Feb. 23, 1915.

Application filed February 24, 1911. Serial No. 610,562.

*To all whom it may concern:*

Be it known that I, LEWIS C. VAN RIPER, of the borough of Manhattan, city, county, and State of New York, have invented certain new and useful Improvements in Starting Devices for Explosive-Engines, of which the following is a specification.

The purpose of this invention is to provide a starting device for explosive engines which will release the crank handle, or other means used in operating the device, from the engine shaft upon forward or backward rotation of said engine shaft by its engine and avoid any danger to the person or mechanism when a back fire occurs, and is an improvement upon several pending applications for Letters Patent, filed by me in the United States Patent Office. as follows: Sept. 12, 1910, Serial No. 581,600; Oct. 6, 1910, Serial No. 585,577; Jan. 25, 1911, Serial No. 604,565; Feb. 20, 1911, Serial No. 609,760; Feb. 23, 1910, Serial No. 610,168, and two applications filed by me jointly with Abraham Novick as follows: Nov. 30, 1910, Serial No. 594,834; Dec. 14, 1910, Serial No. 597,335, in both of which I have acquired the entire interest of said Abraham Novick by assignments duly recorded in the United States Patent Office. In this application I have shown a modified form of release wherein rollers are used to form a roller bearing for the friction surface which is wedge shaped and therefore will not be so likely to slip under severe strain.

I am aware that dogs are shown and claimed in my co-pending application Serial No. 609,760, filed February 20th, 1911 and it is not my intention to claim broadly herein the use of dogs for releasing the clutch on back fire of engine, but to limit my present invention to the particular kind or style of dogs shown and described herein which I have termed for the purpose of distinction "sliding friction dogs."

To the accomplishment of the aforesaid objects, my invention consists in the peculiar novel construction, arrangement and combination of parts hereinafter described.

Reference is to be had to the accompanying drawings forming a part of this specification.

Like numerals of reference wherever they occur, denote like parts throughout this specification and drawings, wherein:

Figure 1 is a side view partly in section of my device as attached to an automobile frame, Fig. 2 is an end view of the clutch mechanism, Fig. 3 shows the principal parts in detail, Fig. 4 is a section line A—A of Fig. 3. Fig. 5 is a sectional view with a variation in the friction dogs and the non-rotatable friction surface.

This device consists of a supporting member 1 fastened to the front cross member 2 of an automobile frame, or it may be fastened direct to the engine or other suitable place. The bearing 4 which forms a part of the supporting member 1 carries the crank handle shaft 3, at one end of which is fastened the crank handle 6 while the other end is formed into a flattened portion 7 as shown in Figs 3 and 4. When the crank handle shaft 3 is rotated in the direction of arrows 11 and 12 the flattened portion 7 of shaft 3 bears against the clutch members 8 and 9 at 27 and 28 respectively, thus forcing the said clutch members 8 and 9 apart and causing the wedge shaped friction shoes 15 and 16 to frictionally grip the friction disk 10 which may be a part of or connected to the engine shaft 18. The clutch members 8 and 9 are guided in each other by the plungers 13 and 14. This said frictional gripping takes place only upon the continued forward rotation of the crank handle shaft 3 until the sliding friction dogs 19 and 20 are forced backward on their rollers 29 in the direction of arrow 21 against their respective springs 23 and 22 due to their friction against the non-rotatable friction surface 5 which forms a part of the supporting member 1. When the engine back fires a backward impulse is imparted to the engine shaft 18 which rotates the friction disk 10 backward, while the clutch members 8 and 9 are prevented from rotating backward along with the friction disk 10 by means of the sliding friction dogs 19 and 20 wedging themselves against the non-rotatable friction surface 5 thereby reducing the friction between the friction shoes 15 and 16 and the friction disk 10 thus permitting the friction disk 10 to rotate backward without the starting device following, as the said reduced friction allows the friction disk 10 to slip on the friction shoes 15 and 16. When the engine starts forward under its own power the increased speed of the engine shaft over the speed of the starting device will automatically release the starting device from the engine shaft, but more positive means may be used by adapting the disengaging plates 17 and 24, plate 17 being fastened to clutch member 8 and plate 24 to clutch member 9. The hook ends 25 and 26 of the plates 24 and 17 respectively reaching around the crank handle shaft 7 as shown in Fig. 2.

The sliding friction dogs 19 and 20 may be wedge shaped with the non-rotatable friction surface having a wedge shaped groove to match as shown in section in Fig. 5. This construction makes the friction grip of the sliding friction dogs on the non-rotatable friction surface more positive.

What I claim, is:

1. In a starting device adapted to be used in connection with explosive engines, the combination of an annular grooved friction surface upon or connected to an engine shaft, an expanding friction clutch rotatable both forward and backward, having wedge shaped friction shoes to engage the said grooved friction surface, means for frictionally connecting said friction clutch to said engine shaft through said friction surface to move connectedly in a forward direction and means for reducing the friction in said frictional connection upon backward rotation of said engine shaft by its engine, said friction reducing means comprising a non-rotatable friction surface, sliding friction dogs, inclined planes upon said rotatable clutch members, rollers between said dogs and inclined planes and springs.

2. In a starting device adapted to be used in connection with explosive engines, the combination of an annular grooved friction surface upon or connected to an engine shaft, an expanding friction clutch rotatable both forward and backward, having wedge shaped friction shoes to engage the said grooved friction surface, means for frictionally connecting said friction clutch to said engine shaft through said friction surface to move connectedly in a forward direction, sliding friction dogs, inclined planes upon said rotatable clutch members, rollers between said dogs and inclined planes, a non-rotatable friction surface and springs for keeping the said sliding friction dogs always in frictional engagement with said non-rotatable friction surface.

3. In a starting device adapted to be used in connection with explosive engines, the combination of an annular grooved friction surface upon or connected to an engine shaft, an expanding friction clutch rotatable both forward and backward having wedge shaped friction shoes to engage the said grooved friction surface, means for frictionally connecting said friction clutch to said engine shaft through said friction surface to move connectedly in a forward direction and means for reducing the friction in said frictional connection upon backward rotation of said engine shaft by its engine, said friction reducing means comprising a grooved non-rotatable friction surface, wedge shaped sliding friction dogs, inclined planes upon said rotatable clutch members, rollers between said dogs and inclined planes and springs.

4. In a starting device adapted to be used in connection with explosive engines, the combination of an annular grooved friction surface upon or connected to an engine shaft, an expanding friction clutch rotatable both forward and backward having wedge shaped friction shoes to engage the said grooved friction surface, means for frictionally connecting said friction clutch to said engine shaft through said friction surface to move connectedly in a forward direction, wedge shaped sliding friction dogs, inclined planes upon said rotatable clutch members, rollers between said dogs and inclined planes, a grooved non-rotatable friction surface and means for keeping the said sliding friction dogs always in frictional engagement with the groove in said non-rotatable friction surface.

LEWIS C. VAN RIPER.

Witnesses:
FRANCES SIEGEL,
ABRAHAM NOVICK.

Copies of this patent may be obtained for five cents each, by addressing the "Commissioner of Patents, Washington, D. C."